United States Patent
Haviland

(10) Patent No.: US 6,600,756 B1
(45) Date of Patent: Jul. 29, 2003

(54) METHOD OF IMPROVING THE PERFORMANCE OF A BUS WHICH IS ASYNCHRONOUS-TRAFFIC INTENSIVE

(75) Inventor: Christopher M. Haviland, Sacramento, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/332,920

(22) Filed: Jun. 14, 1999

(51) Int. Cl.$^7$ .................................................. H04J 3/16
(52) U.S. Cl. ....................... 370/468; 370/353; 370/431
(58) Field of Search ................................ 370/229, 230, 370/235, 468, 470, 472, 352, 493, 356, 463, 469, 473, 458, 490, 466, 431, 437; 710/107, 106, 116, 117

(56) References Cited

U.S. PATENT DOCUMENTS

| | | | | |
|---|---|---|---|---|
| 5,621,898 A | * | 4/1997 | Wooten ....................... 370/462 |
| 5,742,847 A | * | 4/1998 | Knoll et al. ................... 710/16 |
| 5,991,520 A | * | 11/1999 | Smyers et al. ............... 709/328 |
| 6,148,357 A | * | 11/2000 | Gulick et al. ................ 710/107 |
| 6,151,651 A | * | 11/2000 | Hewitt et al. ................ 710/315 |
| 6,192,428 B1 | * | 2/2001 | Abramson et al. ............. 710/57 |
| 6,199,132 B1 | * | 3/2001 | Hewitt et al. ................ 710/106 |
| 6,317,415 B1 | * | 11/2001 | Darnell et al. ............... 370/468 |
| 6,381,647 B1 | * | 4/2002 | Darnell et al. ............... 370/320 |

* cited by examiner

Primary Examiner—Huy D. Vu
Assistant Examiner—Justin M. Philpott

(57) ABSTRACT

A method for improving bus performance on a bus which accommodates isochronous and asynchronous traffic and which is asynchronous traffic intensive. The method includes the step of measuring an elapsed time period between predetermined events to determine whether bus traffic is asynchronous intensive. Thereafter, a portion of the isochronous bandwidth is allocated if the measured time period meets or exceeds a predetermined amount. In this manner, large amounts of asynchronous traffic have less latency and still conform to the fairness algorithm given in the bus specification.

11 Claims, 2 Drawing Sheets

Figure 1:
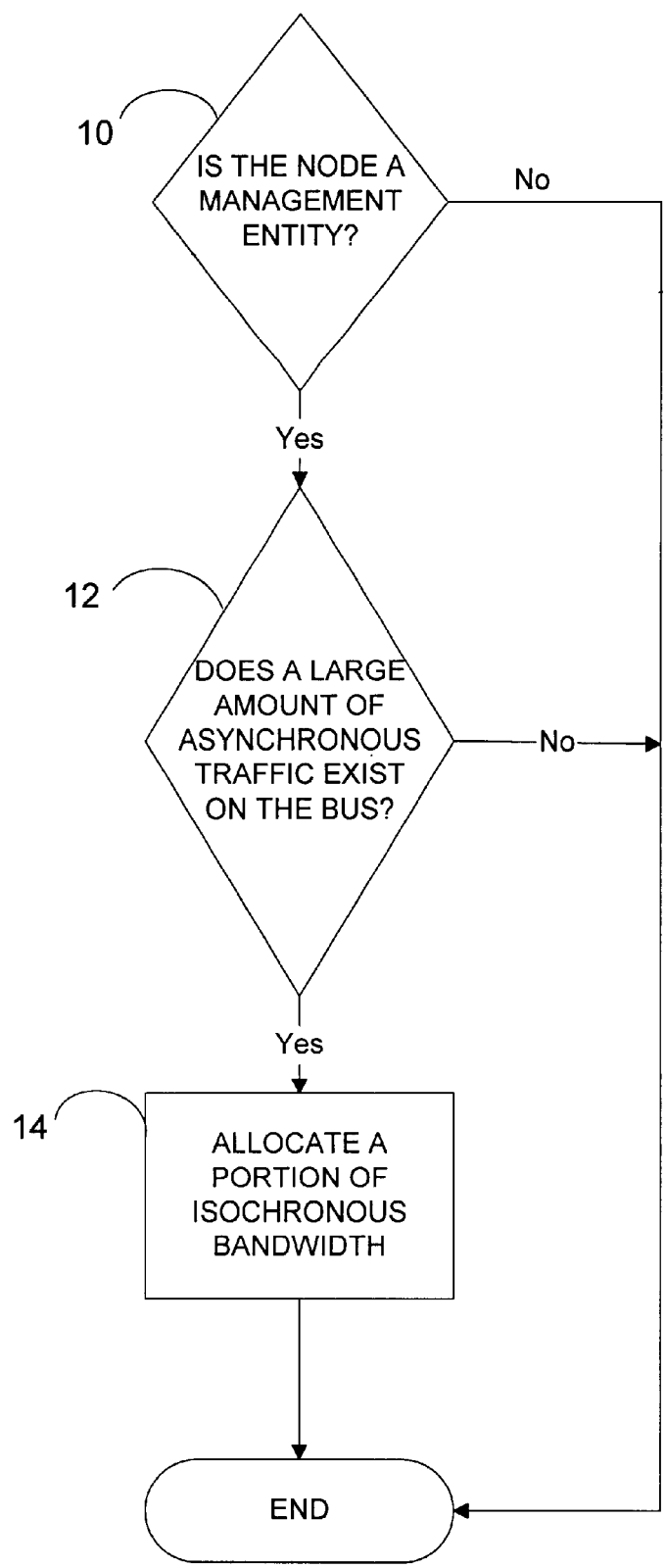

METHOD OF IMPROVING THE PERFORMANCE OF A BUS WHICH IS ASYNCHRONOUS-TRAFFIC INTENSIVE

The present invention generally relates to serial buses, and more particularly relates to improving performance on a bus which is asynchronous-traffic intensive.

Known bus interconnections commonly perform a mix of isochronous and asynchronous transactions, each having different requirements, across a serial bus by sharing an overall bus bandwidth. On the one hand, conventional isochronous applications mandate that data be delivered at regular intervals and generally at a constant rate across the bus and do not require confirmation of data delivery. For example, data being transferred from a music compact disc (CD) to a digital tuner is a candidate for transfers via isochronous transactions. On the other hand, conventional asynchronous applications do not require that data be sent at regular intervals, but do mandate a confirmation of receipt of data, for example when performing Control and Status Register read and write transactions.

Overall bus bandwidth is divided into a number of cycles per second, each cycle having a set nominal cycle time. Each cycle is divided into an isochronous data time (window) and an asynchronous data time (window). A purpose of the isochronous window is to give devices whose data is time critical a guarantee of bus bandwidth and bounded latency. Latency is the time a node must wait before sending data. Nodes wishing to perform isochronous transfers allocate a portion of the total isochronous bandwidth from a node that performs the role of an isochronous resource manager or bus manager.

The IEEE 1394-1995 Standard for a High Performance Serial Bus, for example, specifies a 125 $\mu$S nominal bus cycle, of which 100 $\mu$S is always available for nodes to allocate and use when sending isochronous traffic. Reservation of bandwidth by isochronous devices provides guaranteed bandwidth and bounded latency to devices which send such traffic. The allocation strategy leaves only a 25 $\mu$S window per nominal bus cycle for asynchronous traffic. This division of bus bandwidth gives priority to isochronous devices. Such priority is errant in numerous situations, especially in the computer arena.

Problems occur since the priority given to isochronous traffic can cause high latency periods for devices on the bus which only send data asynchronously. Additionally, since a lengthy asynchronous packet may extend beyond the end of the nominal 125 $\mu$S cycle period, known architectures allow isochronous transactions to catch up in subsequent cycles. Catch up effectively stops asynchronous traffic for a small number of cycles to allow delayed cycle start packets to re-synchronize with the regular cycle period. Asynchronous traffic is stopped because a root node arbitrates with a higher priority in order to send overdue cycle start packets.

For example, if all 100 $\mu$S of isochronous bandwidth are allocated and the asynchronous packet extends beyond its 25 $\mu$S window by 40 $\mu$S, the next two cycles are almost entirely occupied by isochronous transactions, leaving less than 10 $\mu$S available bandwidth for asynchronous transactions. An example of when an asynchronous packet would extend 40 $\mu$S beyond the normal 25 $\mu$S asynchronous window is when an asynchronous device begins transmitting an asynchronous packet 3 $\mu$S before the cycle start packet would normally be sent, and the packet transmission takes 43 $\mu$S.

Thus, a need exists for a method that improves bus performance by preventing isochronous capable devices from utilizing a full 100 $\mu$S per nominal cycle for isochronous traffic, and allows more asynchronous traffic per bus cycle when asynchronous traffic is heavy. Improving bus performance also decreases the number of bus cycles in which the asynchronous window closes to zero time due to a period of isochronous traffic catch up. By reducing the need for catch up periods, isochronous traffic is less choppy, i.e., more reliable, and asynchronous traffic has less latency.

Accordingly, in response to the problems discussed above, a primary object of the present invention is to provide an improved method that prevents isochronous capable devices from allocating additional bandwidth when asynchronous traffic is sufficiently high.

Another object of the present invention is to provide an improved method that prevents isochronous capable devices from allocating additional bandwidth when an asynchronous device has a large amount of data to transmit on the bus.

Yet another object of the present invention is to provide such an improved method which reduces the need for isochronous traffic catch up periods.

Figure 2:
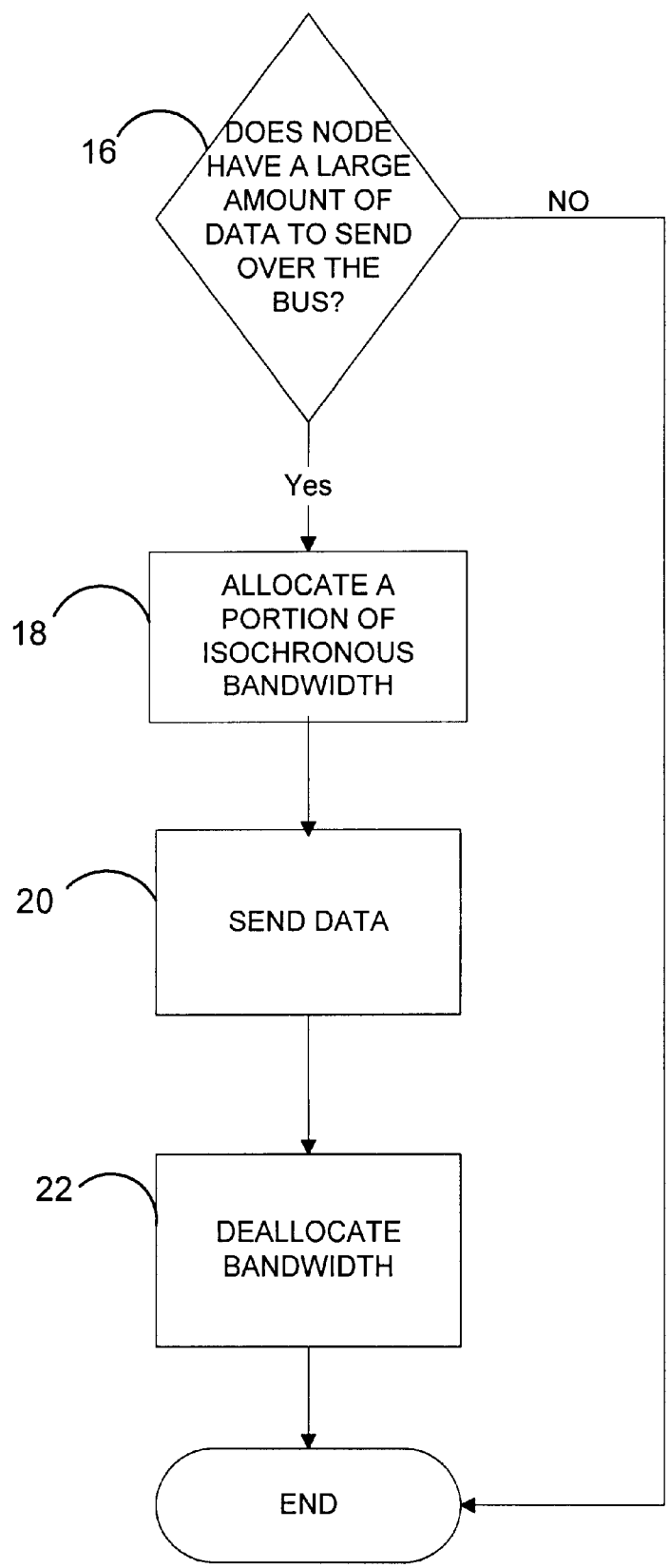

Other objects and advantages will become apparent upon reading the following detailed description, in conjunction with the attached drawings, in which:

FIG. 1 is a flow chart of a first embodiment for carrying out the present invention; and FIG. 2 is a flow chart of a second embodiment for carrying out the present invention.

DETAILED DESCRIPTION

Broadly stated, the present invention is directed to an improved method of handling bus traffic. The method allows for an asynchronous device to allocate isochronous bandwidth which the device will not use to transmit isochronous traffic during an isochronous window. The isochronous window is defined as starting when a cycle start packet is received and ending when a subaction gap occurs, and an asynchronous window is defined as beginning when the subaction gap occurs and ending at the receipt of the cycle start packet. Allowing asynchronous devices to allocate isochronous bandwidth permits more asynchronous bandwidth per nominal bus cycle by preventing isochronous devices from allocating all available isochronous bandwidth. Described below are two ways in which the scheme is implemented. The methods work for the IEEE 1394-1995 Standard while still conforming to a fairness algorithm given in the Standard.

In a first embodiment, a node acts as a management entity, for example, an isochronous resource manager. According to IEEE 1394-1995, within a node space of the isochronous resource manager, are CHANNELS_AVAILABLE and BANDWIDTH_AVAILABLE registers. When a node accesses these registers to obtain isochronous resources, it performs the access using lock transactions.

While the present invention does not allocate isochronous channels, nodes wishing to perform isochronous transfers first obtain an isochronous channel number via the CHANNELS_AVAILABLE register. The node reads a current register value to determine an available channel. Thereafter, a lock compare and swap transaction is used to request the available channel. According to the Standard, the lock transaction is used since more than one node may simultaneously attempt to request a channel. If no other node claims a channel number between the initial register read and the subsequent lock operation, then the lock transfer for this node is successful, otherwise it is not successful.

Once the node obtains a channel, the node acquires isochronous bus bandwidth. Nodes access the BANDWIDTH_AVAILABLE register to request bandwidth needed to perform the isochronous transfers. A bw_remaining field reflects an amount of bus bandwidth in allocation units that is currently available for isochronous transfers. The node reads the BANDWIDTH_AVAILABLE register to determine the total amount of isochronous bus bandwidth remaining, taking into consideration the transfer speed that is supported by the node. If a sufficient isochronous bandwidth is available, the lock compare and swap transaction is then performed in an attempt to acquire the bandwidth needed.

The 1394 Standard defines an algorithm to ensure each node on the bus an opportunity to transmit packets using fair arbitration. The fair arbitration algorithm is as follows. Nodes arbitrate for control of the bus as long as their arbitration enable bits are set. Once such nodes have gained access to the bus, their arbitration bits are cleared to prevent them from initiating another transaction. Clearing the arbitration bit in each node on the bus results in no further request transactions, and as a result a long idle time on the bus.

According to the Standard, when the idle time reaches 20 $\mu$S, for example, all nodes recognize an arbitration reset gap, causing all nodes to set their arbitration enable bits. The 20 $\mu$S arbitration reset gap time is the case when the gap count is 63, which is the case after two consecutive bus resets without an intervening access to the gap count register. The arbitration reset gap is the period of bus idle time prior to the beginning of a fairness interval. According to the present invention, by limiting the amount of isochronous traffic on the bus, devices that have asynchronous data to send will be able to send such data more frequently due to an increased frequency of arbitration reset gaps. For example, if 70 $\mu$S of isochronous bandwidth is allocated for asynchronous traffic in addition to the 25 $\mu$S already available, at least two asynchronous packets (assuming a maximum packet transmit time of 43 $\mu$S) can be sent per nominal cycle assuming no arbitration reset gaps occur. Thus, the method produces an improved bus performance while still conforming to standards such as IEEE 1394-1995.

Referring now to the drawings, and particularly FIG. 1, as stated above, the first embodiment of the present invention is used by a node acting as a management entity (Block 10). The node begins by measuring an elapsed time period between predetermined events, for example, arbitration reset gaps, to determine whether a large amount of asynchronous traffic exists on the bus (Block 12). A portion of the isochronous bandwidth is allocated using the BANDWIDTH_AVAILABLE registers (Block 14), if the measured time period meets or exceeds a predetermined amount, i.e., asynchronous bus traffic is significant. Whether or not the amount of asynchronous traffic on the bus is significant is application dependent. For example, asynchronous traffic may be considered sufficiently large when the time elapsed between arbitration reset gaps is greater than or equal to four cycles.

Artisans will appreciate that the isochronous bandwidth is allocated from an isochronous resource manager or a bus manager. The portion of the isochronous bandwidth allocated is preferably between 10 and 90 percent of available isochronous bandwidth, and varies depending on the application. It is noted, however, that allocating too little bandwidth, for example 1%, would have as negligible an effect as if the algorithm were not implemented. Conversely, allocating too great a bandwidth could act to bar the sending of any true isochronous traffic.

Referring now to FIG. 2, in a second embodiment of the present invention, a node allocates isochronous bandwidth when the node has a sufficiently large amount of asynchronous data to send over the bus (Block 16). For example, scanners or printers, which have a limited ability to buffer data, often require sending a vast amount of data asynchronously across the bus. Additionally, a digital camera or CD ROM (read only memory), for example, may need to send large amounts of data asynchronously to utilize the retry functions only offered with asynchronous transmissions.

Whether or not the amount of asynchronous data the node has to send is sufficiently large is system dependent. As an example, if the amount of asynchronous data which the node needs to send is greater than the node's capability to buffer such data, then the node implements the method of the present invention. Another example of when the node may implement this method is if the node runs low on buffering resources during a transmission of a large block of data.

In these situations, the node accesses the isochronous resource manager using the known methods described above to allocate a portion of the isochronous bandwidth, when available (Block 18). After the isochronous bandwidth is allocated, the large amount of asynchronous data is sent (Block 20). Thereafter, the bandwidth which was previously allocated is deallocated using known methods (Block 22).

It should be noted that the two embodiments of the present invention are performed independently of each other. From the foregoing description, it should be understood that an improved method for handling bus traffic has been shown and described which has many desirable attributes and advantages. The method improves bus performance by allocating a portion of the isochronous bandwidth when traffic on the bus is asynchronous intensive. By allocating isochronous bandwidth, the present invention can increase the frequency of arbitration reset gaps, and each device on the bus will have more opportunities to send asynchronous data.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A method for improving bus performance for a bus which accommodates isochronous and asynchronous traffic in a nominal predetermined proportional allocation of bandwidth in a known nominal cycle time period and which is asynchronous traffic intensive, wherein the asynchronous traffic can extend the cycle time period beyond the known nominal time period, the method comprising the steps of:

determining whether a node is a management entity;
   if said node is said management entity,
   a) measuring an elapsed time period between predetermined events, the relative occurrence of which events are correlative of asynchronous bus traffic, to determine whether bus traffic is asynchronous intensive; and
   b) reallocating a portion of the isochronous bandwidth for sending the asynchronous traffic if said measured time period meets or exceeds a predetermined amount.

2. The method as defined in claim 1 wherein said predetermined amount is four cycles or more.

3. The method as defined in claim 1 wherein the bus is a high performance serial bus operated in accordance with IEEE 1394-1995 Standard and said predetermined events are arbitration reset gaps.

4. The method as defined in claim 1 wherein said reallocated portion of the isochronous bandwidth is between 10 and 90 percent of available isochronous bandwidth.

5. The method as defined in claim 1 wherein said step of reallocating a portion of the isochronous bandwidth is accomplished with an isochronous resource manager.

6. A method for improving bus performance for a bus which accommodates isochronous and asynchronous traffic in a nominal predetermined proportional allocation of bandwidth in a known nominal cycle time period and which is asynchronous traffic intensive, wherein the asynchronous traffic can extend the cycle time period beyond the known nominal time period, the method comprising the steps of:

determining whether a potential shortage of buffering space exists within a node;

if said potential shortage of said buffering space exists, a) reallocating a portion of the nominal isochronous bandwidth to asynchronous bandwidth when said amount of asynchronous data exceeds the nominal asynchronous bandwidth allocation; and b) sending asynchronous data utilizing said reallocated isochronous bandwidth and said asynchronous bandwidth.

7. The method as defined in claim 6 further comprising the step of deallocating the isochronous bandwidth after completing the step of sending said asynchronous data.

8. The method as defined in claim 6 wherein said potential shortage of said buffering space is indicated when an amount of asynchronous data which a node is sending is greater than a capability of said node to buffer said amount of asynchronous data.

9. The method as defined in claim 6 wherein said potential shortage of said buffering space is indicated when a node is low on buffering resources during a transmission of a block of asynchronous data.

10. The method as defined in claim 6 wherein said allocated portion of the isochronous bandwidth is between 10 and 90 percent of available isochronous bandwidth.

11. The method as defined in claim 6 wherein said step of reallocating a portion of the isochronous bandwidth is accomplished with an isochronous resource manager.

* * * * *

UNITED STATES PATENT AND TRADEMARK OFFICE
CERTIFICATE OF CORRECTION

PATENT NO. : 6,600,756 B1 Page 1 of 1
DATED : July 29, 2003
INVENTOR(S) : Christopher M. Haviland It is certified that error appears in the above-identified patent and that said Letters Patent is hereby corrected as shown below:

Column 4,
Line 60, after "bandwidth" insert -- of subsequent cycles --
Line 61, delete "the" and insert -- additional --
Line 61, after "traffic" insert -- adjacent to the bandwidth allocation of the current asynchronous traffic --
Line 63, after "amount" delete the period and insert -- effectively extending the time period of a current cycle beyond the known nominal time period --

Column 5,
Line 20, after the first occurrence of "bandwidth" insert -- of subsequent cycles --
Line 20, after the second occurrence of "bandwidth" insert -- for sending additional asynchronous traffic adjacent to the bandwidth allocation of the current asynchronous traffic --
Line 22, after "allocation" insert -- effectively extending the time period of a current cycle beyond the known nominal time period; --

Signed and Sealed this

Fifteenth Day of March, 2005

JON W. DUDAS
*Director of the United States Patent and Trademark Office*